United States Patent [19]
Garcia

[11] Patent Number: 5,211,685
[45] Date of Patent: May 18, 1993

[54] FIRE HYDRANT BASE ENCLOSURE

[76] Inventor: Robert S. Garcia, 14131 Garber St., Arleta, Calif. 91331

[21] Appl. No.: 852,387

[22] Filed: Mar. 16, 1992

[51] Int. Cl.$^5$ ............................................. F16L 35/00
[52] U.S. Cl. .................... 137/295; 137/397; 137/797; 285/3; 403/2
[58] Field of Search ........... 137/68.1, 294, 295, 137/296, 377, 797; 220/724, 725; 222/541; 285/2, 3, 4

[56] References Cited

U.S. PATENT DOCUMENTS

| | | | |
|---|---|---|---|
| 1,883,467 | 10/1932 | Banks | 285/2 |
| 2,017,600 | 10/1935 | Lofton | 137/68.1 |
| 2,083,054 | 6/1937 | Cline | 285/2 |
| 2,171,078 | 8/1939 | Cline | 137/797 |
| 2,249,848 | 7/1941 | O'Brien | 137/797 |
| 2,262,356 | 11/1941 | Corey | 285/2 |
| 2,282,641 | 5/1942 | Corey | 285/2 |
| 2,340,965 | 2/1944 | Kiesel | 137/294 |
| 3,002,775 | 10/1961 | Mueller et al. | 137/68.1 |
| 3,738,390 | 6/1973 | Luckenbill | 285/2 |
| 3,800,486 | 4/1974 | Harvey | 285/4 |
| 3,846,030 | 11/1974 | Katt | 285/4 |
| 3,899,196 | 8/1975 | Dashner | 285/2 |
| 4,127,142 | 11/1978 | Snider | 285/3 |
| 4,146,288 | 3/1979 | Ramsay et al. | 285/2 |
| 4,790,342 | 12/1988 | Segal | 137/797 |
| 4,827,969 | 5/1989 | Lyasko | 137/296 |
| 4,905,725 | 3/1990 | Sinkinson et al. | 137/797 |

Primary Examiner—George L. Walton
Attorney, Agent, or Firm—Robert M. Sperry

[57] ABSTRACT

An improved procedure and apparatus for mounting and replacing fire hydrants including a hollow, box-like structure comprising a plastic cylinder which can enclose the hydrant-mounting flange to protect the flange, yet which can quickly and easily be removed and replaced, even by unskilled workmen, to provide access to the hydrant-mounting flange and the break-away bolts without requiring expensive and time-consuming cement work.

13 Claims, 4 Drawing Sheets

FIRE HYDRANT BASE ENCLOSURE

BACKGROUND

1. Field of Invention

This invention relates to fire hydrants and is particularly directed to an enclosure for the base of a fire hydrant to facilitate replacement of damaged or broken hydrants.

2. Prior Art

In modern cities, which often extend over hundreds of square miles, the ever-present risk of fire has caused such cities to provide fire hydrants at numerous locations about the city, which are connected to the city water distribution system and, hence, can instantly supply water as required for fighting any fires which occur. Normally, the pipes of the municipal water distribution system are buried beneath the city streets and the fire hydrants are located on the curb or sidewalk immediately adjacent such streets. This makes it easier for firemen to find and attach hoses to the hydrants, when necessary. Unfortunately, such streetside location also exposes the fire hydrants to the likelihood of being rammed, accidentally or otherwise, by motor vehicles, such as cars, trucks, busses and the like, causing leakage or severing of the hydrants. In fact, the incidence of such damage to fire hydrants is so great that it is standard practice to connect a fire hydrant to the municipal water system by means of a pipe having a flange and to atach the fire hydrant to the flange with break-away bolts, in order to minimize damage to the fire hydrant per se when such collisions do occur. According to standard practice, an area around the hydrant is usually dug out in order to provide access to the flange and to enable the fire hydrant to be attached to the flange with the break-away bolts. Normally, this dug out area will be approximately one foot deep and have a diameter approximately one foot larger than that of the pipe which supplies the water from the municipal water system. This dug-out area is filled with sand, dirt or the like and is paved over so as to be level with the surrounding sidewalk. Unfortunately, when a fire hydrant is damaged or severed from the flange, the replacement of the fire hydrant is a major operation. First, the water department must be called to shut off the flow of water to the hydrant. Next, a maintenance crew must be sent out to cut away the cement. Then, another crew must be sent out to remove and inspect the damaged fire hydrant and to deliver and mount a new hydrant. Finally, a cement crew must be sent out to re-fill the area around the hydrant with new cement. The actual working time required for each such hydrant replacement will vary from about 1–10 hours and the cost, including the cost of workmen, supervisors, vehicles, etc. can easily amount to approximately $150–$1500. Since collisions between vehicles and fire hydrants are fairly common occurrences, it is obvious that the standard procedure for mounting and replacing fire hydrants involves a very considerable expenditure of time and money.

BRIEF SUMMARY AND OBJECTS OF INVENTION

These disadvantages of prior art procedures for mounting and replacing fire hydrants are overcome with the present invention and an improved procedure and apparatus are provided for mounting fire hydrants which greatly reduces the time, labor and expense required for installing and replacing fire hydrants and which eliminates the need for removing and replacing cement about the base of the hydrant.

These advantages of the present invention are preferably attained by providing an improved procedure and apparatus for mounting and replacing fire hydrants including a hollow, box-like structure comprising a plastic cylinder which can enclose the hydrant-mounting flange to protect the flange, yet which can quickly and easily be removed and replaced, even by unskilled workmen, to provide access to the hydrant-mounting flange and the break-away bolts without requiring expensive and time-consuming cement work.

Accordingly, it is an object of the present invention to provide an improved procedure and apparatus for mounting and replacing fire hydrants.

Another object of the present invention is to provide an improved procedure and apparatus for mounting and replacing fire hydrants which greatly reduces the time, labor and expense of such operations.

An additional object of the present invention is to provide an improved procedure and apparatus for mounting and replacing fire hydrants which eliminates the need for removing and replacing cement about the base of the hydrant.

A specific object of the present invention is to provide an improved procedure and apparatus for mounting and replacing fire hydrants including a hollow, box-like structure comprising a plastic cylinder which can enclose the hydrant-mounting flange to protect the flange, yet which can quickly and easily be removed and replaced, even by unskilled workmen, to provide access to the hydrant-mounting flange and the break-away bolts.

These and other objects and features of the present invention will be apparent from the following detailed description, taken with reference to the figures of the accompanying drawings.

DETAILED DESCRIPTION OF THE INVENTION

Figure 1:
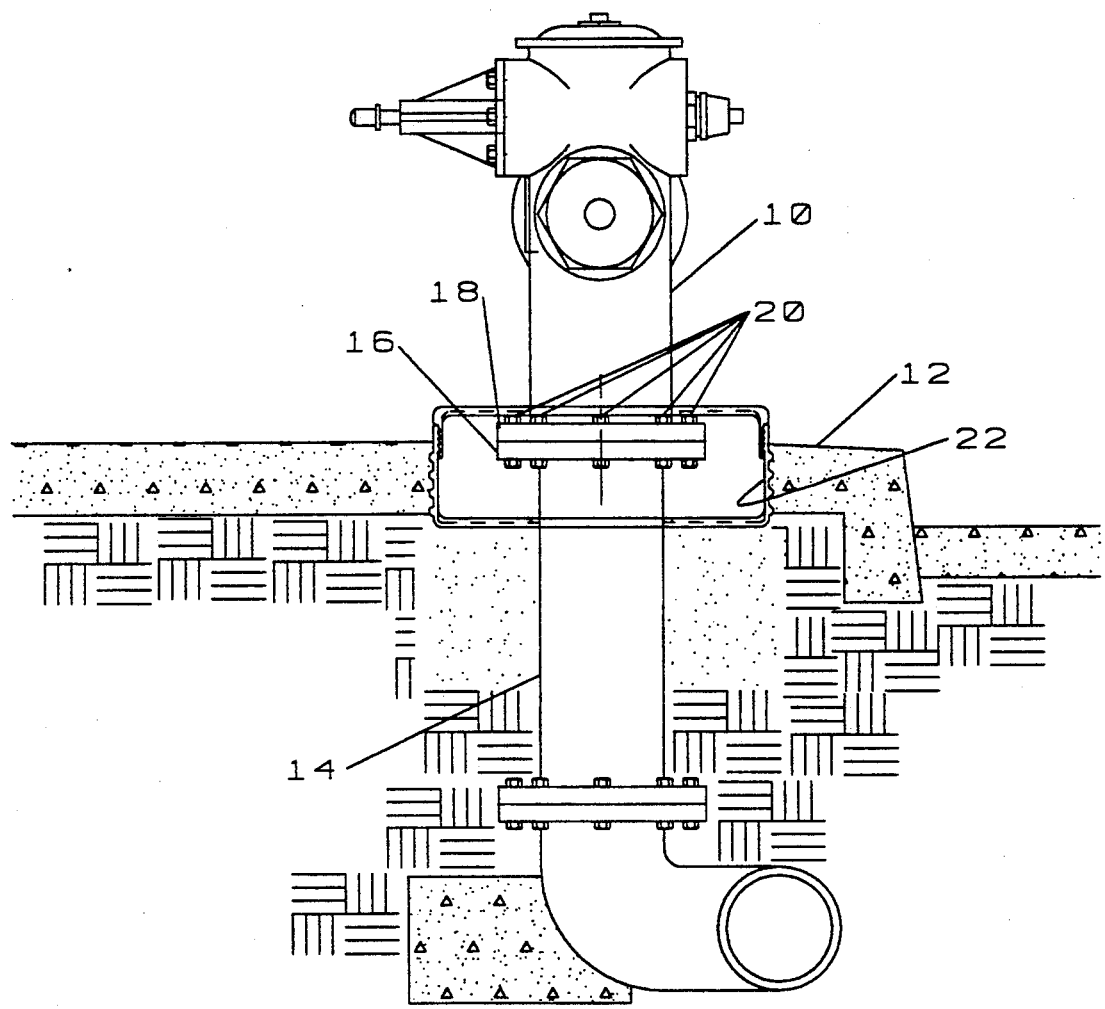
FIG. 1 is a diagrammatic representation showing a fire hydrant having its base enclosed in cement according to the prior art procedure.

FIG. 1 shows a fire hydrant, indicated generally at 10, mounted in a sand and cement base enclosure 12 in accordance with the procedures of the prior art. As shown, a standpipe 14 supplies water to the hydrant 10 from a municipal water main or the like, not shown, and terminates in a flangeplate 16. The fire hydrant 10 has a lower flange 18 which sits on the flangeplate 16 and is secured thereto by suitable means, such as break-away bolts 20. Conventionally, a hole 22 approximately one foot deep and having a diameter approximately one foot larger than that of the standpipe 14 is dug out about the flangeplate 16 and, after the hydrant 10 has been secured to the flangeplate 16 by means of the break-away bolts 20, the base enclosure 12 is formed by filling the hole 22 with sand or dirt, which is covered with a layer of cement so as to be level with the surrounding sidewalk.

If the hydrant 10 is struck by a vehicle, the break-away bolts 20 are designed to shear off to allow the hydrant 10 to be displaced, so as to minimize damage to the hydrant 10. Unfortunately, the displacement of the hydrant 10 causes the upper portion of the cement base enclosure 12 to be shattered. Thus, in order to replace, the hydrant 10, it is necessary to call a water department crew to shut off the water flowing through the standpipe 14 and a work crew with jackhammers or picks and shovels to dig out the remainder of the cement base enclosure 12, so as to provide access to the flangeplate 16 to enable reattachment of the hydrant 10 with new break-away bolts 20. Thereafter, a cement crew must be called to pour a new cement base enclosure, such as the base enclosure 12, to again enclose the flangeplate 16, flange 18 and the break-away bolts 20. As noted above, the working time required for each such hydrant replacement is about 1-10 hours and the cost, including the cost of workmen, supervisors, vehicles, etc. can easily amount to approximately $150-$1500 for each such replacement.

Figure 2:
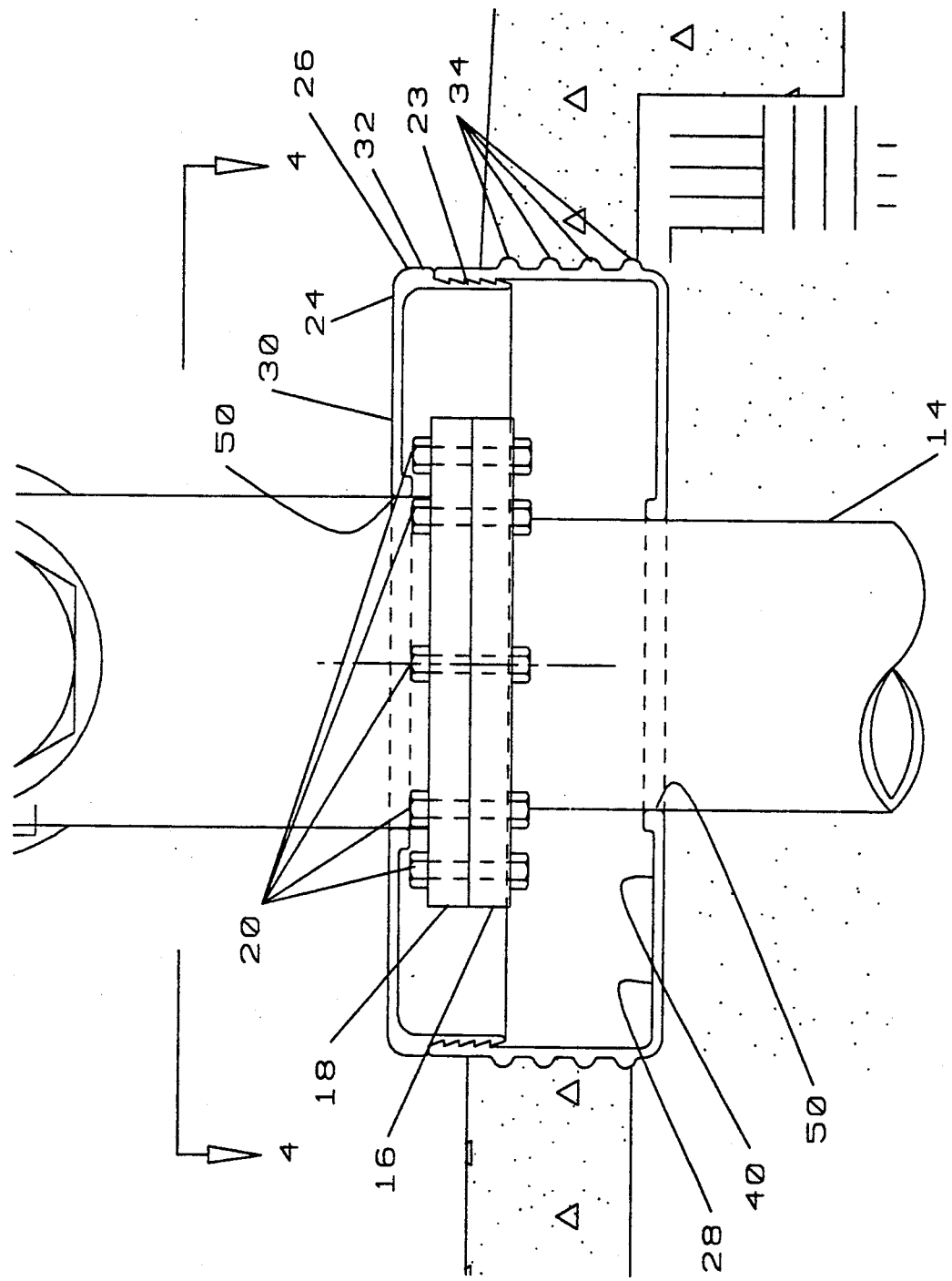
FIG. 2 is a view, similar to that of FIG. 1, showing a fire hydrant having its base enclosed with a base enclosure device embodying the present invention.
Figure 3:
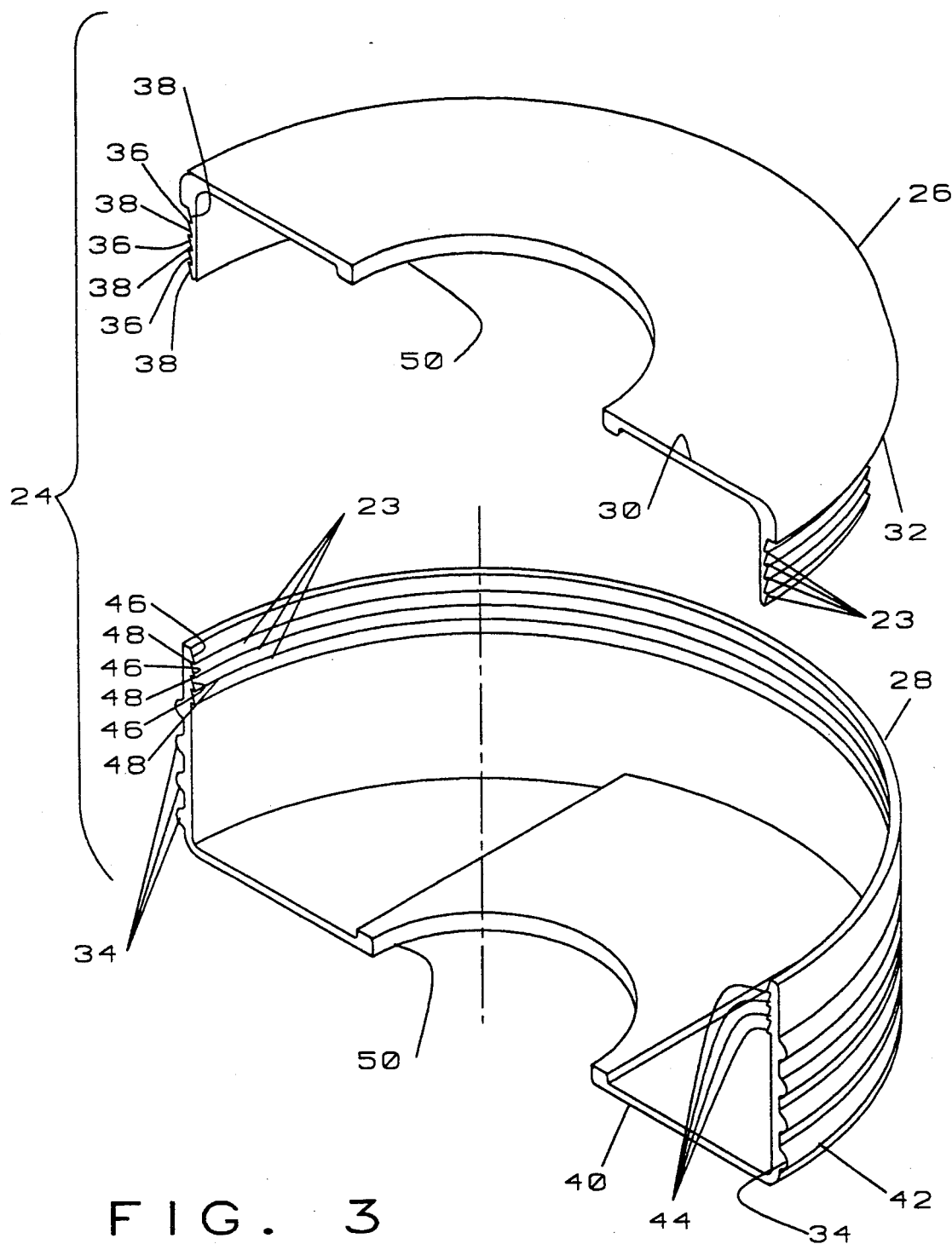
FIG. 3 is an exploded isometric view showing one upper half and one lower half of the fire hydrant base enclosure device of FIG. 2.

FIG. 2 shows the fire hydrant 10 mounted in a base enclosure 24, embodying the present invention. The base enclosure 24 is basically a hollow, box-like structure which encloses the flange plate 16, flange 18 and break-away bolts 20, replacing the cement block base enclosure 12 of FIG. 1, and comprises four semi-cylindrical members. There are two identical upper members 26 and two identical lower members 28 and the upper members 26 mate with the lower members 28, as best seen in FIGS. 2 and 3. The members 26 and 28 are formed of material, such as plastic or metal, which is sufficiently rigid to readily support a person standing on the base enclosure 24. As best seen in FIG. 3, each of the upper members 26 comprises a half cylinder having a flat, generally disc-like upper surface 30 with a side wall 32 extending perpendicularly downward from the periphery of the upper surface 30 and formed with a plurality of ridges 22 projecting outwardly from the side wall 32, each having a slanted lower surface 36 and a substantially horizontal upper surface 38. Each of the lower members 28 comprises a half cylinder having a flat, generally disc-like lower surface 40 with a side wall 42 extending perpendicularly upward from the periphery of the lower surface 40 and formed with a plurality of ridges 22, projecting inwardly from the side wall 42 to mate with the ridges 22 which project outwardly from the sidewall 32 of the upper member 26, each having a slanted upper surface 46 and a substantially horizontal lower surface 48. Each of the members 26 and 28 is formed with a central recess 50 which, when the members 26 and 28 are assembled form openings to fit closely about the standpipe 14 or hydrant 10. If necessary or desirable, suitable gasket material, not shown, may be interposed between the recesses 50 and the adjacent hydrant 10 of standpipe 14 to provide a watertight seal therebetween. If desired, the lower members 28 may also be formed with a plurality of outwardly projecting ridges, as best seen at 34 in FIGS. 2 and 3, for engagement with the surrounding layer of cement and, hence, to prevent dislocation of the lower member 28 in the event the upper member 26 is forcably removed, as by a collision of a vehicle with the fire hydrant 10.

Figure 4:
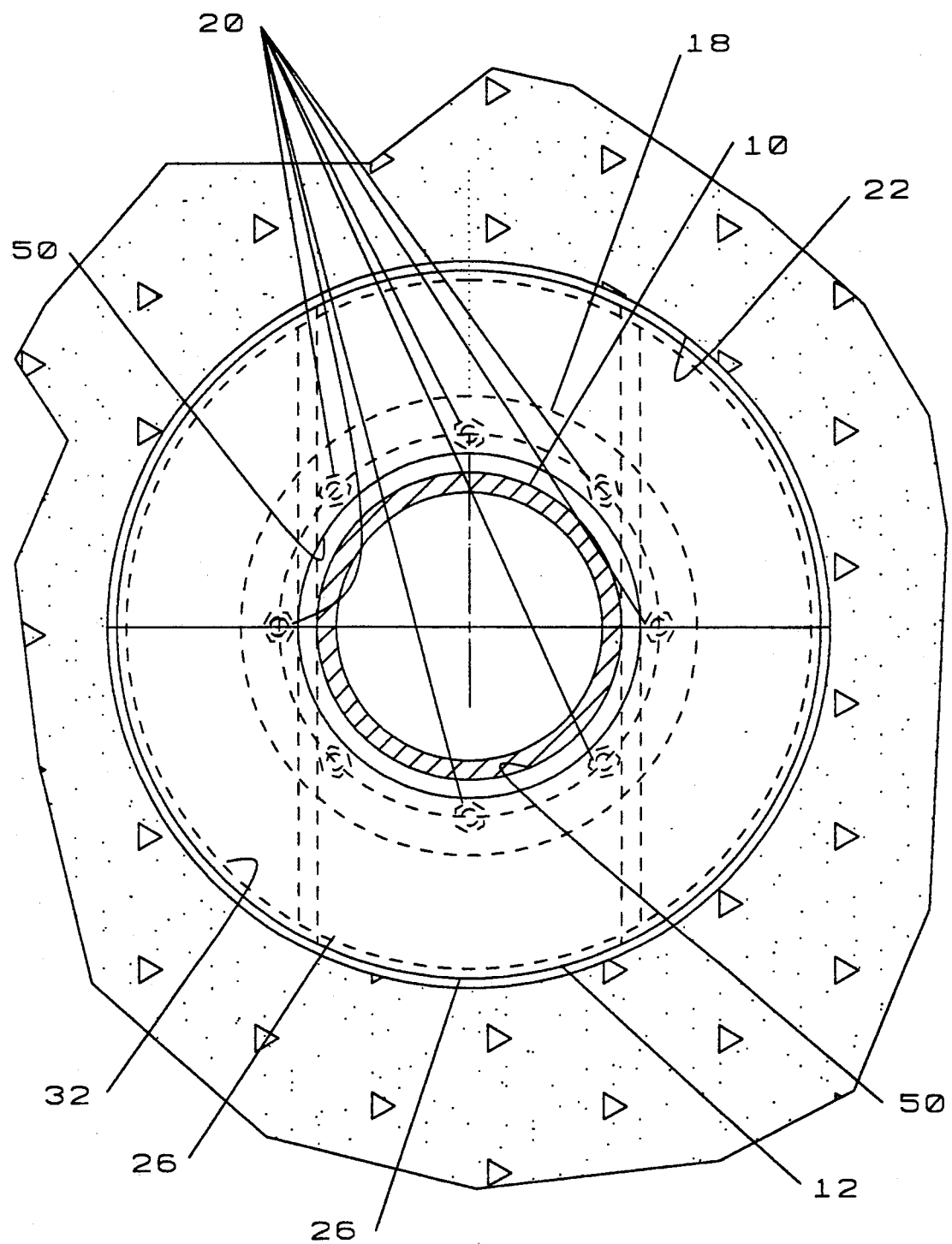
FIG. 4 is a transverse view, partly in section, taken on the line 4—4 of FIG. 2, of the fire hydrant and base enclosure of the present invention.

In use, two of the lower members 28 are placed in the bottom of the hole 22 with their adjacent edges abutting each other and with the recesses 50 abutting the standpipe 14, as seen in FIG. 2, and with their side walls 42 extending upward along the edges of the hole 22. Next, the flange 18 of the fire hydrant 10 is secured to the flangeplate 16 by suitable means, such as break-away bolts 20. Finally, two of the upper members 26 are placed about the hydrant 10, overlying the flange plate 16 and flange 18, with their adjacent edges abutting each other and with the recesses 50 abutting the hydrant 10 and with the side walls 32 engaging the side walls 42 of the lower members 28. The two upper members 26 are then pressed downward, causing the ridges 23 of the upper members 28 to ratchet over the ridges 44 of the lower members 28 for form the integral base enclosure 24, as seen in FIGS. 2, 3 and 4. Obviously, the assembly of the base enclosure 24 can be accomplished in a matter of minutes, even by unskilled workmen. Moreover, once assembled in this manner, the base enclosure 24 cannot easily be disassembled, due to the interlocking action of the ridges 34 and 44, and, hence, serves to protect the flangeplate 16, flange 18 and bolts 20 against weather, tampering, etc. In the event of a collision, the break-away bolts 20 will allow the hydrant 10 to shear off, as usual, and it will be necessary to call a water department crew to turn off the flow of water through the standpipe 14. The shearing off of the hydrant 10 will probably also result in damage to and dislocation of the upper members 26 of the base enclosure 24. However, once the water has been turned off, it is an easy matter to remove the upper members 26 and, hence, to obtain access to the flangeplate 16 to reseat and resecure the flange 18 of the hydrant 10 with the break-away bolts 20. Then, if necessary or desirable, the lower members 28 may be replaced, by simply removing the old lower members 28 and inserting the new lower members 28. New upper members 26 may then be applied, in the manner described above, in only minutes and without requiring any skilled workmen or any cement work, either for removal or replacement. Thus, the base enclosure 24 is renewed and the hydrant 10 is restored to operation, quickly and easily and at minimum cost of time and money.

Obviously, numerous variations and modifications can be made without departing from the spirit of the present invention. Therefore, it should be clearly understood that the form of the present invention described above and shown in the figures of the accompanying drawing are illustrative only and are not intended to limit the scope of the present invention.

What is claimed is:

1. A device for enclosing the ground-level mounting flange of a fire hydrant, said device comprising:
   a hollow, box-like structure having at least two parts independent of said hydrant and releasably mountable to completely enclose said mounting flange and the flangeplate of a water pipe to protect the ground surface about said mounting flange and said flangeplate in the event of severance of said mounting flange from said flangeplate.

2. The device of claim 1 wherein:
   said box-like structure comprises at least two members formed to fit closely about said hydrant and said pipe.

3. The device of claim 2 wherein:
   said two members are semi-cylindrical.

4. the device of claim 1 wherein:

said box-like structure is formed of rigid material.
5. The device of claim 1 wherein:
said box-like structure is formed of plastic.
6. The device of claim 1 wherein:
said box-like structure is formed of metal.
7. The device of claim 1 wherein:
said box-like structure comprises four semi-cylindrical members.
8. The device of claim 7 wherein:
said box-like structure comprises two identical upper members and two identical lower members and the upper members mate with the lower members.
9. The device of claim 8 wherein:
each of said upper members comprises a half cylinder having a flat, generally disc-like upper surface with a side wall extending perpendicularly downward from the periphery of said upper surface and formed with a plurality of ridges projecting from said side wall, and
each of said lower members comprises a half cylinder having a flat, generally disc-like lower surface with a side wall extending perpendicularly upward from the periphery of said lower surface and formed with a plurality of ridges projecting from said side wall.
10. The device of claim 9 wherein:
the ridges of said upper members are formed to ratchetly engage the ridges of said lower members.
11. The device of claim 9 wherein:
the ridges on said upper members project outward therefrom, and
the ridges on said lower members project inwardly therefrom.
12. The device of claim 11 wherein:
the ridges on said upper members are each formed with a slanted lower surface and a substantially horizontal upper surface, and
the ridges on said lower members are each formed with a slanted upper surface and a substantially horizontal lower surface.
13. The device of claim 1 wherein:
said box-like structure is sufficiently rigid to support the weight of a person standing thereon.

* * * * *